United States Patent [19]
Drevitch

[11] 3,722,393
[45] Mar. 27, 1973

[54] PORTABLE CAMERA SUPPORT DEVICE WITH AIMING STRUCTURE
[75] Inventor: Nolan A. Drevitch, Norwood, Mass.
[73] Assignee: Polaroid Corporation, Cambridge, Mass.
[22] Filed: Dec. 28, 1970
[21] Appl. No.: 101,595

[52] U.S. Cl. .................................. 95/86, 248/291
[51] Int. Cl. ............................................ G03b 17/56
[58] Field of Search ............ 240/1.3; 95/86; 248/291

[56] References Cited

UNITED STATES PATENTS

| | | | |
|---|---|---|---|
| 2,290,307 | 7/1942 | Wicker | 95/86 |
| 704,403 | 7/1902 | Thill | 95/86 X |
| 2,042,983 | 6/1936 | Fairchild | 95/86 X |
| 2,535,152 | 12/1950 | Nelson | 95/86 |
| 2,623,236 | 12/1952 | Borchers | 248/291 |
| 2,900,764 | 7/1961 | Wilder | 95/86 |
| 3,413,944 | 8/1964 | Takats | 95/86 X |
| 3,171,336 | 3/1965 | Schwimmer | 95/86 X |

Primary Examiner—Samuel S. Matthews
Assistant Examiner—Michael Harris
Attorney—Brown and Mikulka, William D. Roberson and Robert L. Berger

[57] ABSTRACT

Support for removably mounting a portable camera. Aiming movement structure for the camera provided in the support about two orthogonally disposed axes. At rest location and situation for the camera on the support providing free use of both hands by camera operator. Support collapsible to storage when not in use. Suitcase storage for camera. Suitcase with built-in identification photograph treatment capability: timing, laminating, cutting, sealing. Console presentation for operation of these capabilities. At rest situation of the camera favorable to film loading and removal.

7 Claims, 14 Drawing Figures

INVENTOR.
NOLAN A. DREVITCH
BY
Brown and Mikulka
ATTORNEYS

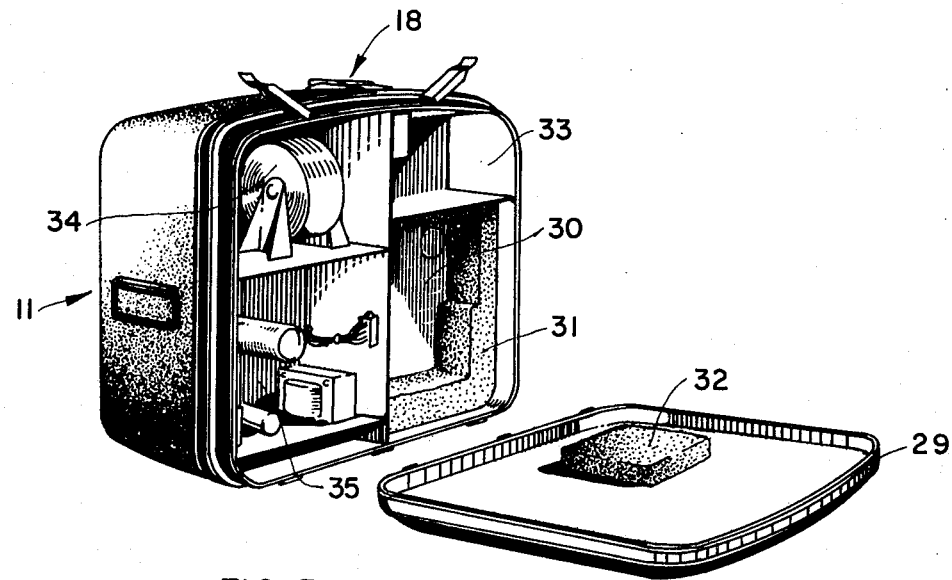
FIG. 3
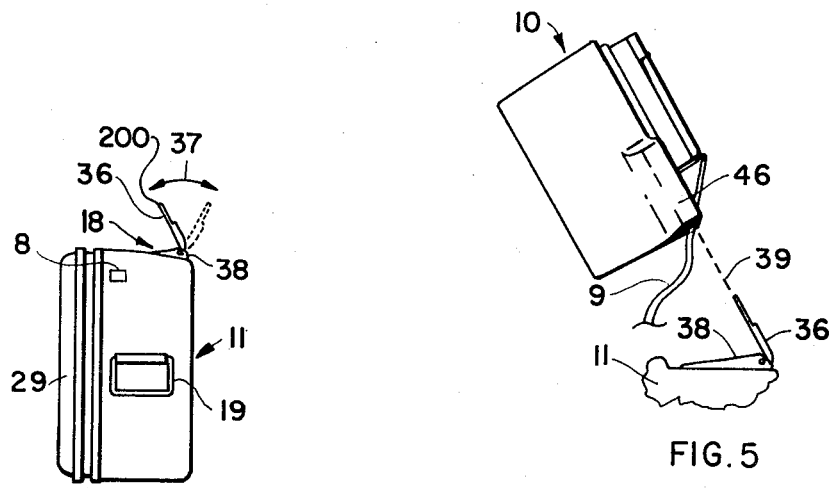
FIG. 4
FIG. 5

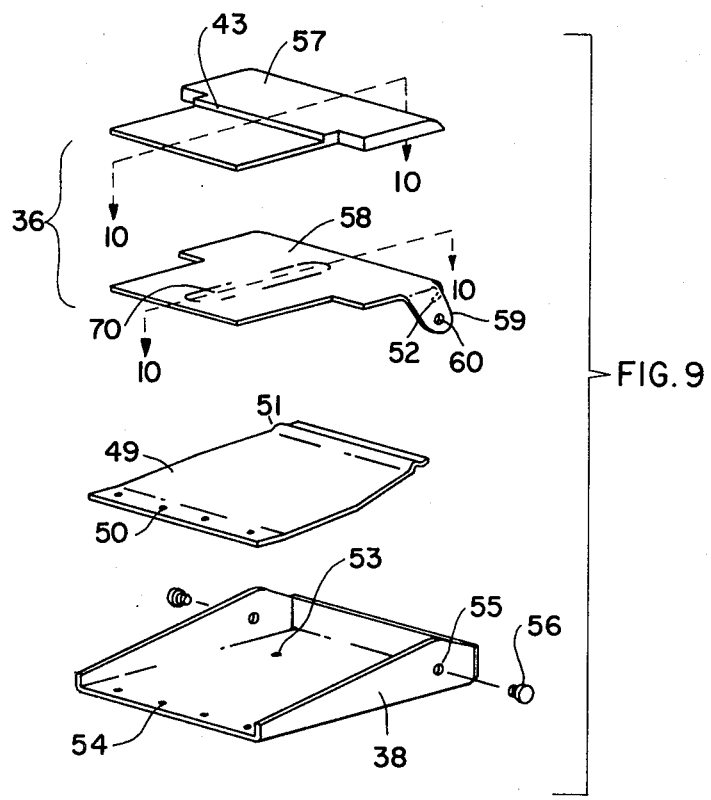
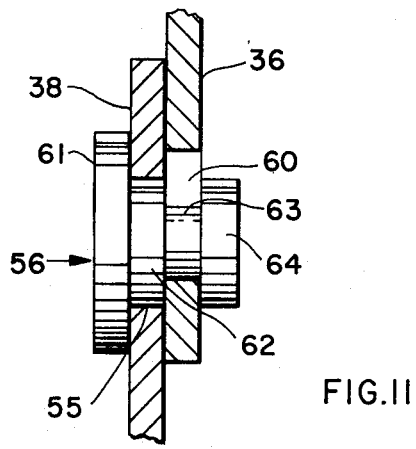
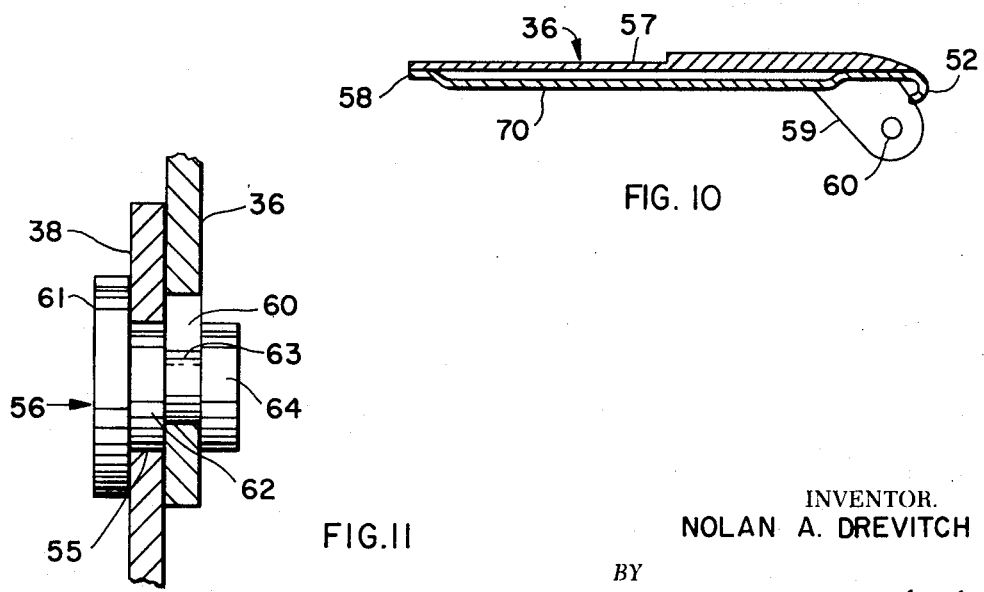
FIG. 9
FIG. 10
FIG. 11
INVENTOR.
NOLAN A. DREVITCH
BY
Brown and Mikulka
ATTORNEYS

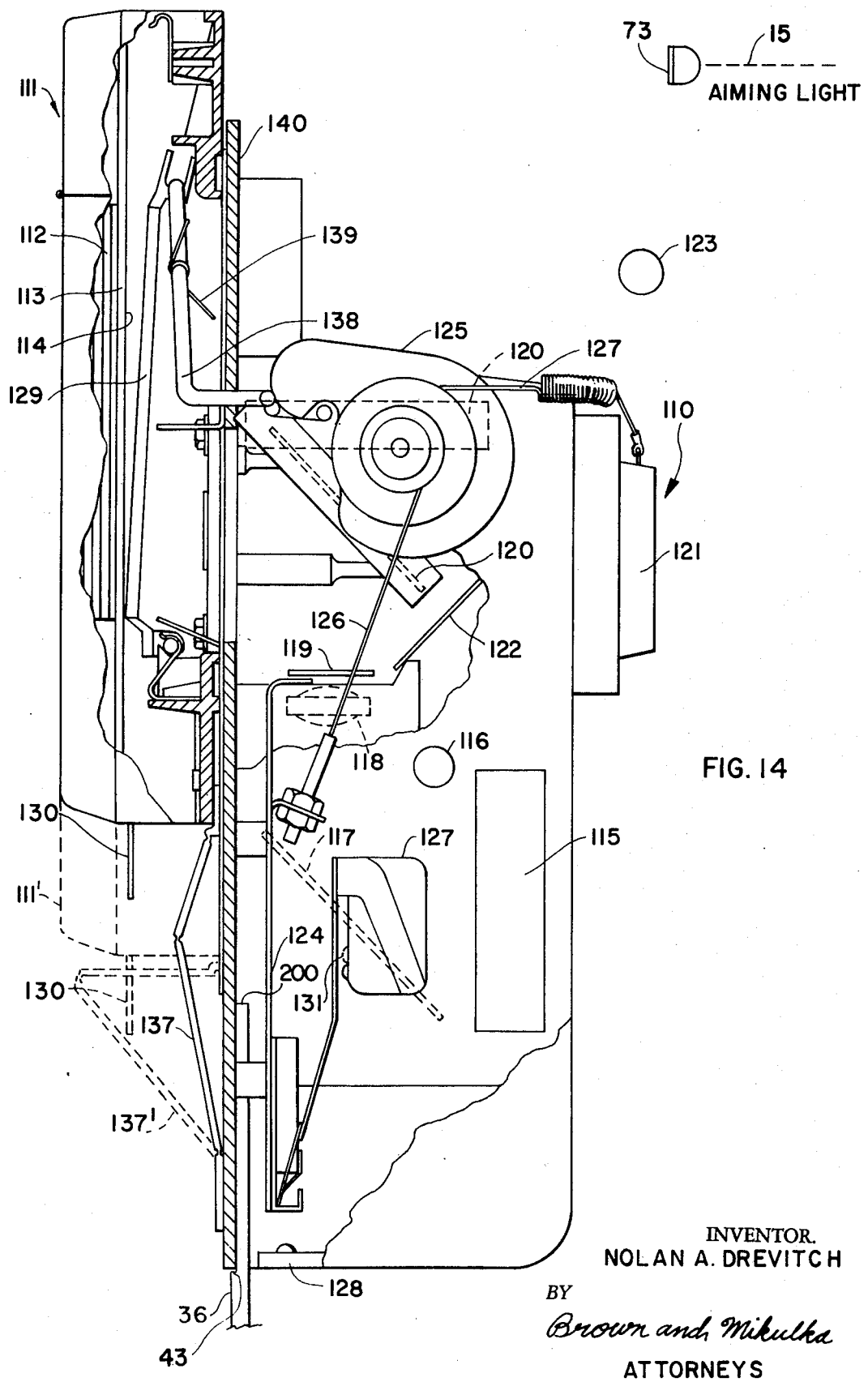

PORTABLE CAMERA SUPPORT DEVICE WITH AIMING STRUCTURE

This invention relates to photographic systems and, more particularly, to photographic systems for producing identification cards.

Such systems have achieved significant importance in modern living and business. Their use has become widespread, and is rapidly expanding in use and importance bordering on necessity.

In one use, identification card producing photographic systems have been established as substantially permanent installations in areas of a high degree of use. Banks, industrial plants, and governmental agencies are examples of such installations. In such installations, units of the system may be arranged along a table, and two or more operators may be used to keep the operation going at a desirable rate. Such units comprise, in addition to a camera, devices for treatment of an identification photograph, such as timers, a laminator, a cutter, and a sealer. One such system is the Polaroid ID-2 Land Identification System produced by Polaroid Corporation, Cambridge, Massachusetts.

Modern systems of this nature, in order to be most useful and efficient, need to be in fully, effective use as nearly as possible to 100 percent of available working time. Such permanent installations can be used to this degree of effectiveness by spreading out the various units of the system so that one or more photographs may be in the process of being treated while another is being taken. The nature of such installations is such that more than one operator may be used, without them getting in each other's way, and the system thus brought to its fullest peak of effectiveness.

Some such installations may be operated full time on a time sharing basis as between neighboring users, each needing such identification card service only on a part time basis.

A problem arises when the neighbors are less close, and when in fact they are spread out over substantial distances, too great for such time sharing operation.

The need for identification card service is just as acute in small business or other users, such as branch offices of governmental agencies. However, the cost of permanent installations at remote locations, for small quantity users, is a serious deterrent.

In order to properly service such remote, small percentage time users, a portable identification card producing photographic system is provided.

This invention relates to such a portable system and in particular to structure and combinations in which a portable camera is moved from place to place. In furtherance of this concept, the camera is provided with a portable support for fully effective use of the camera, including a provision for camera movement to accomplish aiming, for example with respect to a light beam from the camera to a particular predetermined point on the subject. This portable camera and mounting is provided with all the various and usual associated units for treatment of an identification photograph.

This invention is accomplished through the use of a portable case, like a suitcase, with the various units of timing, laminating, cutting, and sealing built into permanent assembly in the case. The camera is provided with a carrying niche within the case during portage and a camera mount on the case for use when the camera is to be operated.

The case is provided, on one side and part of the top with an operational console in that all operations of the system may be carried out quickly and efficiently by a single operator standing in a single location. Handling and servicing of the camera is included in this console operation since the camera operational mount is located on top of the case and is provided with an at rest position which frees both hands of the operator and makes the necessary portions of camera readily available and accessible for adjustment and for film loading and removal.

Accordingly, in order to service small users at spaced locations in an efficient manner, a complete identification card photographic system is packaged in a suitcase and is readily set up and used by a single operator. The compact and efficient assembly of this system makes it possible for an operator to set up and take down the system in a very short time. Thus a single operator may service many small users in minimal time, and, in effect, provide to a substantial degree, the time sharing benefits enjoyed by users in more closely spaced locations.

Of particular importance in this portable system is the operational mounting for the camera. It is provided with storage capability when not in use, and when in use is provided with support and camera aiming capabilities which are a large factor in the effective use of this portable system.

The camera support is a pivoted camera mounting tongue which is folded down for storage and portage. It is provided with an upwardly extending holding location as a means of facilitating the mounting of the camera thereon. It is provided with spring return bias about its pivot, and with torsional movement capability about an axis perpendicular to the axis of the tongue's pivot. Thus the camera may be aimed in two directions to cover an essentially rectangular field of location of the aiming spot of the aiming beam of the camera.

The camera support is such as to hold the camera up off the carrying case, so the camera can be leaned forward against the top of the carrying case in an angled, at-rest position. Further, the spring bias about the support tongue pivot is sufficiently strong to respond with a small operating force differential with respect to the camera's weight, as the camera is moved by an operator through the aiming arc above the carrying case. Thus an operator may adjust the aiming of the camera and hold the camera in a particular aimed situation, with an essentially delicate and precise touch.

An example of a camera usuable in combination with or in support of this invention is an identification card camera in which a single photograph is provided, on mutually exclusive areas with a photograph of a subject and a photograph of data associated with the subject, with the additional feature of reproduction of a validating signature which may incurse in both the subject and data pictures. A further form of such a camera involves the concept of providing two identification cards from one sheet of film by providing a photographic material sheet and to present first one portion of this sheet to the optical system of the camera, and then to so present another portion of the photographic sheet. In general structure, as indicated in the illustrative example of this invention as presented herein, the camera is provided with a front section containing the optical system, and a back section containing the photographic film. This back section is movable between up and down positions, to present two different areas of the photographic sheet to the optical system.

Identification card cameras of this nature are described in the following copending applications:

| Ser. No. | Inventor | Filing Date | U.S. Pat. No. |
|---|---|---|---|
| 864,632 | J. F. Pasieka | 10/8/69 | |
| 849,960 | B. K. Johnson | 6/25/70 | 3,683,764 |
| 78,032 | M.A. Seiden | 10/5/70 | 3,641,886 |
| 78,033 | D. E. Moodie | 10/5/70 | 3,678,818 |
| 78,103 | D. E. Moodie | 10/5/70 | 3,674,965 |
| 77,916 | A. P. Bjork et. al. | 10/5/70 | |
| 864,630 | D. E. Moodie | 10/8/69 | 3,631,773 |

An object of this invention, therefore, is to provide a portable identification card camera system.

Another primary object of this invention is to provide a portable identification card camera system with a device for ready and effective mounting and dismounting a camera on and from a carrying device.

A further object of this invention is to provide a portable identification card camera system with built-in associative combination facilities such as timing, laminating, cutting, and sealing.

A further object of this invention is to provide a collapsible camera mounting structure on a carrying device for a portable camera.

Other objects and advantages of this invention will be in part apparent and in part pointed out hereinafter and in the accompanying drawings, in which:

FIG. 3 is a perspective of the carrying case of FIG. 2, of the opposite side with respect to FIG. 2, with the side cover open, and illustrating the system mounting and storage areas within the carrying case;

FIG. 4 is a side view of the carrying case of FIGS. 2 and 3, illustrating the camera operational support and one mode of its camera aiming movement capability.

FIG. 5 is a side view of a portable camera in position about to be mounted on the camera support structure on the carrying case, according to this invention;

FIG. 9 is an exploded view of the portable camera operational situation support structure according to this invention;

FIG. 10 is a section of the camera mounting portion of FIG. 9, taken on line 10—10 with the two top elements of FIG. 9 in assembly;

FIG. 11 is a fragmentary, sectioned illustration of the stud mounting assembly of the two top elements and the bottom element of FIG. 9;

Figure 13:
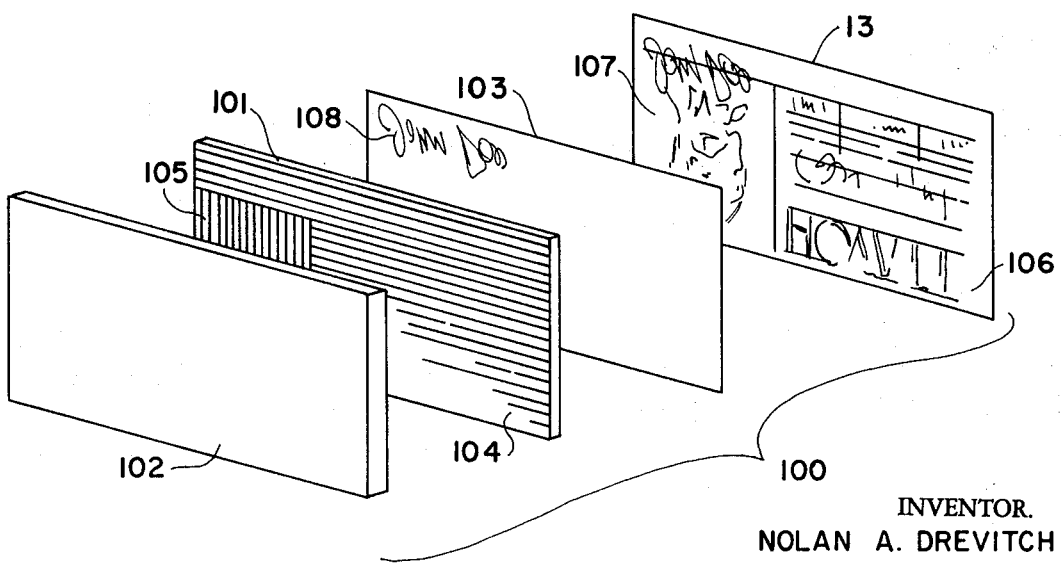

FIG. 13 is a diagrammatic exploded perspective of a section of a validation and polarizing plate forming a part of a camera for use with the system of this invention and illustrating the operable relationship between that plate and a section of a sheet of photographic material mounted in the camera; and FIG. 14 is a comprehensive showing of much of a camera for use with the system of this invention, in the form of a side elevation, partially cut away, partially sectional, and schematic in parts.

Figure 1:
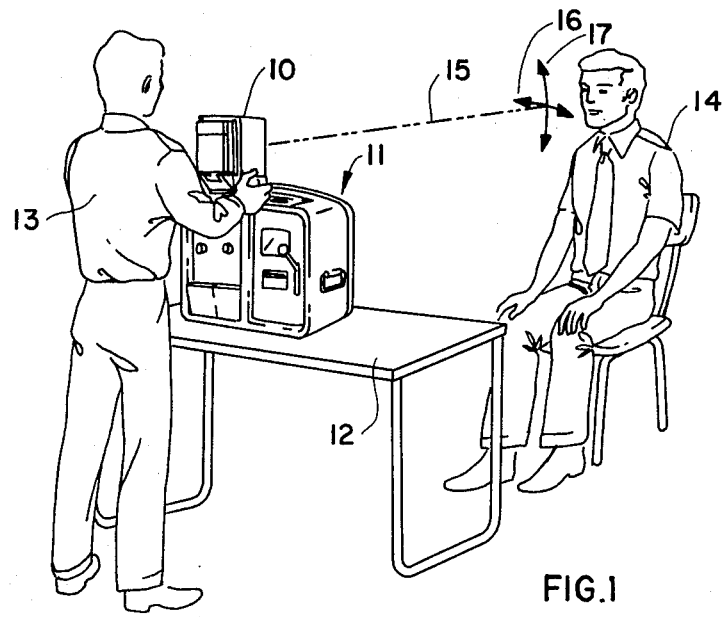
FIG. 1 is a pictorial representation of a portable identification card camera system in operation, according to this invention.

In the operation illustration of FIG. 1, a portable camera 10 is mounted on a carrying case 11 which in turn rests on a convenient base such as a table 12. A camera operator 13 is shown as using the camera 10 to photograph a subject 14, with the aid of an aiming light in the camera. The aiming light beam 15 is movable horizontally as indicated at 16, and vertically as indicated at 17. This essentially universal aiming movement capability is the result of a combination of pivotal and torsional movement structure embodied in the portable camera support structure linking the camera 10 with the carrying and support case 11. By way of example, with the subject 14 at a distance of 54 inches from the camera lens for proper focus and magnification, the camera aiming movement at the subject, may be on the order of 30 inches (arrow 17) by 6 inches (arrow 16).

Figure 2:
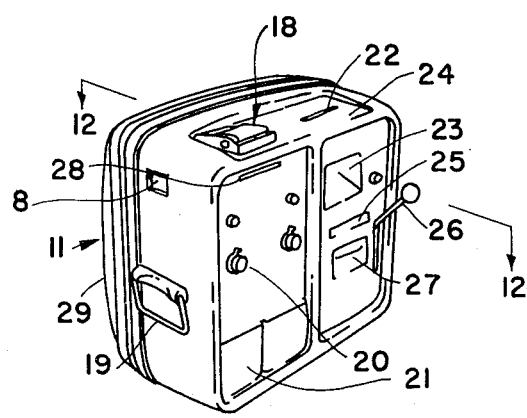
FIG. 2 is a perspective of a camera system carrying case as a supportive embodiment of this invention, illustrating the console operating face of the case and, in collapsed condition, the camera operational support structure.

In FIG. 2, the carrying case 11 is shown with the camera 10 removed from the top of the case, and camera mounting structure 18 collapsed into a situation compatible with carrying the case 11 about. In this circumstance, the camera removed from the mounting structure 18 is stored within the case 11 and carried about through the use of case handles such as indicated at 19.

Figure 7:
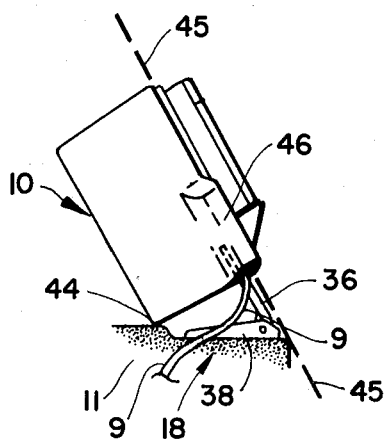
FIG. 7 is a side view of a portable camera operationally mounted according to this invention, in at rest position of full accessibility.

The carrying case 11, as illustrated in FIGS. 1 and 2, presents a console to an operator, such that, after camera aiming and operation as in FIG. 1, the camera is released by the operator and achieves an at rest position against the case 11. As indicated in FIG. 7, in this at rest position, the camera is angled forward. In this position, the camera back may be adjusted and film loaded and removed from the camera because the plane 45 of the back of the main body of the camera, clears the case 11. As is typical in self-developing cameras, removal of a film unit from the camera effects the distribution of a processing fluid between the exposed photosensitive and image-receiving sheets of that film unit. This situation allows an operator to have both hands free and provides ready access to and clearance for camera adjustment and for film loading and unloading.

The identification card console situation provides access to all the devices carried by and built into the case 11. Timing device control is indicated at 20, and a pouch structure 21 is provided for holding a film unit newly removed from the camera, during development time. A top slot 22 receives the film to be laminated after which it is taken out through an exit opening 23.

The slot 22 and the camera mounting structure 18 are both located in a depression 24 in the top of the case, so as to be out of the way and protected while the case is being moved.

The FIG. 2 console is continued with an entrance slot 25 for a double card film unit cutter, actuated by a cutter arm 26 and exited as two single cards by way of the opening 27. The final, sealing step is accomplished by placing each single laminated card unit in a plastic pouch and placing it in the slot 28 for sealing.

These various console devices do not form a part of this invention in any detail other than the concept of a carrying case, with built in devices of this nature, as a carrier and operational support for a portable camera.

FIG. 2 also indicates a removable back 29 for the case 11, and an electrical plug 8 for a supply umbilical to camera when one is mounted on the case at 18.

In FIG. 3, the carrying case 11 is shown with its back 29 removed. A recess 30 is provided for carrying the camera inside the case, with suitably foam cushion material therefor provided within the case at 31, and on the inside of the back at 32. A recess 33 houses a sealing device. The recess 34 houses a lamination device. Finally, the recess 35 houses a cutting unit and a power supply for system. For the camera, a supply plug 8 is provided in the wall of the case, for electrically connecting the camera to the supply when the camera is mounted on top of the case, through a connector cable 9 as in FIG. 7 for example. Inside the recess 33, at the top, is a support plate, seen more clearly at 65 in FIG. 12, as an anchor for the camera support structure 18.

In FIG. 4, an illustration is given of camera aiming movement capability 37 of a tongue 36 as a pivoted part of the camera support structure 18 mounted on a base 38 as a part of the structure 18. The tongue 36 is storable, as in FIG. 2 and is movable as in FIG. 4 as a part of the aiming movement.

As in FIG. 5, the tongue 36 has a detent position, as shown, in which it stands ready at about 45 degrees with respect to its base to receive the camera 10. Thus the camera may be grasped by its handles 46, and dropped down on the tongue 36 along a line indicated at 39. FIG. 5 also illustrates the camera power supply umbilical 9 which, with a suitable plug on its end, connects into the supply plug 8 in the carrying case 11.

Figure 6:
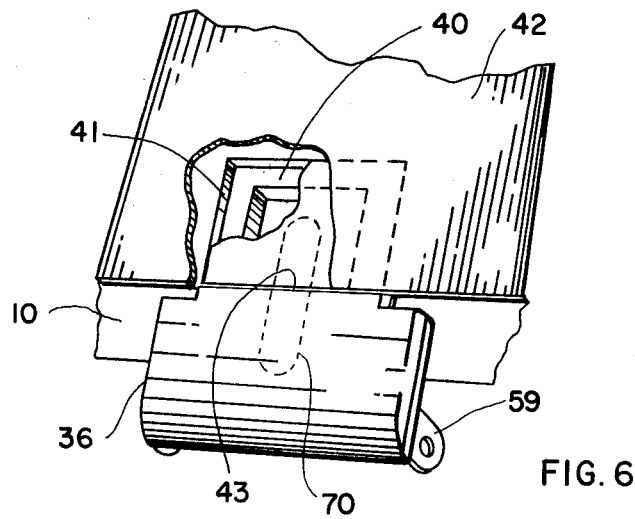
FIG. 6 is an illustration of the immediate area of mounting of a camera to a portable support structure according to this invention.

FIG. 6 shows the camera mounting tongue 36 as it is inserted into the back of the camera 10. The tongue 36 lies on a shoulder 40 within the camera, and is contained laterally therein by a shoulder 41 also within the camera. A camera back cover plate 42 is secured to the camera and overlies the tongue 36. The tongue 36 is provided with a transverse shoulder 43 and an upper flat edge 200 (See FIGS. 4 and 14), which latter feature limits the extent of the support tongue 36 into the camera. The camera 10 is thus mounted on the upper part of the tongue 36 and is consequently located a significant distance away from the support structure base 38.

As in FIG. 7, such location of the camera 10 on the support tongue 36 is demonstrated, and its relation to an at rest position for the camera, is shown. When the camera is so mounted on the tongue 36, the camera may be leaned forward, about the pivot of the tongue 36, until the forward lower edge of the camera engages the top of the camera case 11, as at 44. In this position, the camera handles 46 may be relinquished by the operator who then has both hands free to adjust the camera back, to load film, or to remove film, and to operate the various capabilities of the console showing of FIG. 2.

The FIG. 7 at rest location of the camera 10 illustrates, as indicated by the broken line 45, that movements pertaining to the back of the camera, such as film removal, are free of interference by the case 11, since the line 45 is indicated as passing the top corner of the case, on the console side.

Figure 12:
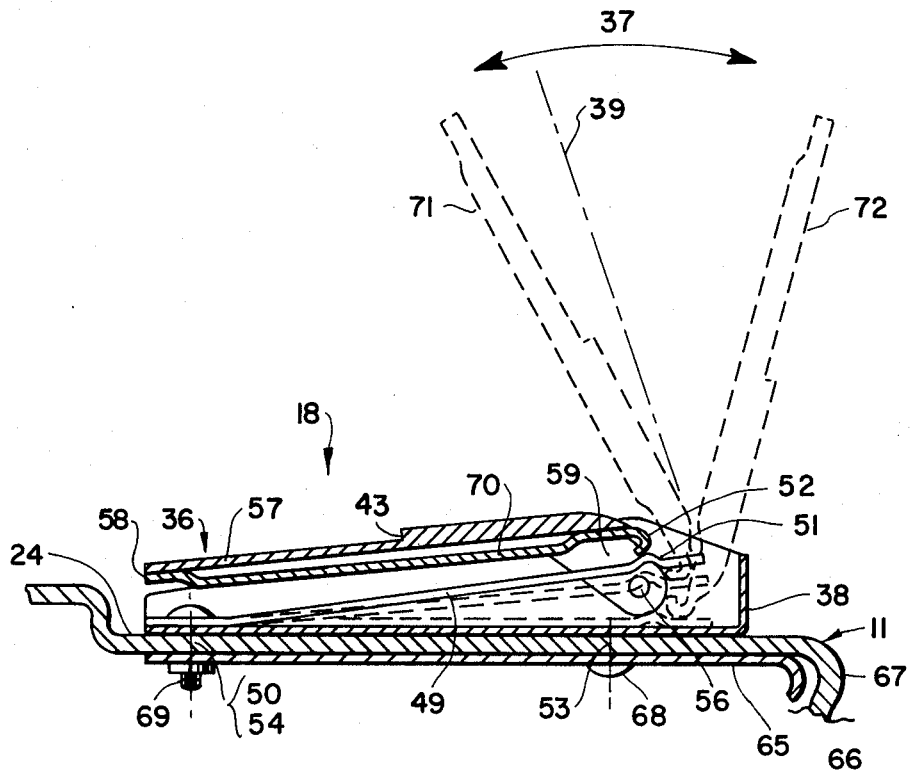
FIG. 12 is an illustration of the structure of FIG. 9, as assembled and mounted on the carrying case, illustrating the capability of the camera support in the aiming movement mode of FIG. 4, and sectioned along line 12—12 of FIG. 2.

The camera support tongue 36 thus has two stable positions without the camera. One is in storage as in FIG. 2, and the other in anticipation of camera mounting thereon, as in FIG. 5. The position of the tongue 36, as in FIG. 7 with the camera mounted thereon and with the camera at rest, is indicated in FIG. 12 by the broken line 39. Whenever the support tongue 36 is displaced away from its detent position in a clockwise direction as viewed in FIG. 12, it is under a constant spring bias about its pivot tending to return it to its detent position. Similarly, whenever the support tongue 36 is displaced out of its "folded" position as shown in solid lines in FIG. 12 of the drawings towards its detent position and prior to its actually reaching the detent position, it is under a constant spring bias about its pivot tending to return it to its "folded" position.

The support structure 18 provides the camera thereon with aiming movement in two directions. One such direction is accomplished about the pivot of the tongue 36 in its base 38, and is indicated by the movement arrow 37 in FIG. 4 and the movement arrow 17 in FIG. 1. This is movement wherein the spring bias on the tongue 36 about its pivot in the base 38 is manually overcome by an operator, by grasping the camera handles 46. The spring bias is provided at a strength so related to the weight of the camera as to provide a small operating force differential. Thus, after the operator has initially lifted the camera from its at rest position of FIG. 7, the camera is essentially above the support structure and its weight offsets a substantial portion of the spring bias. See the operating movement indicated at 37 in FIG. 4.

Figure 8:
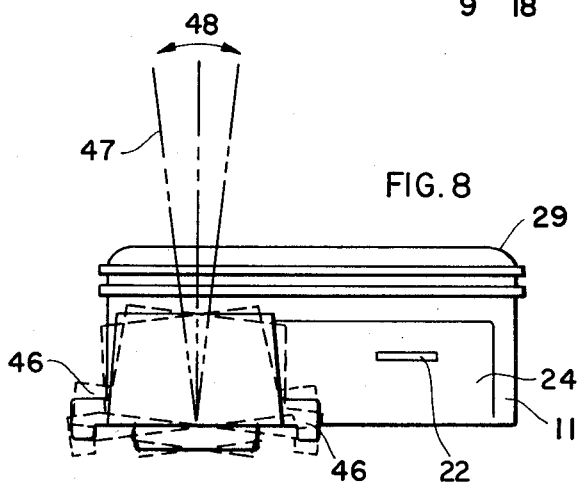
FIG. 8 is a top view of a portable camera operationally mounted according to this invention and illustrating its capability in a second mode of aiming movement.

The second direction of camera aiming movement is torsional. This movement capability is built into the camera support structure 18, in that the support tongue 36 is formed of a stainless steel plate 58, see FIG. 9, covered by a protective plastic member 57. The plate 58 has a wide lower portion and a narrower upper portion on which the camera is mounted. This plate is significantly resiliently torsional about its lengthwise central axis. The camera aiming result is indicated in FIG. 8 by the aiming arc indicated by aiming lines 47 and the transverse arrow 48. In FIG. 1, this movement is indicated by the arrow 16.

The support structure 18 is detailed in FIGS. 9, 10, 11, and 12. It comprises a base plate 65 within the carrying case 11, a support base 38 on the top of the case 11, the support tongue 36 pivotally mounted on the base 38, and a bias spring 49 located between the support base 38 and the tongue 36.

The spring 49 is a leaf spring in sheet form extending essentially fully both across and lengthwise of the support structure 18. The back end portion of the spring 49 is a flat transverse mounting strip with mounting holes 50 therethrough. As the spring extends forward, it is formed with an upward bend at a small angle and terminates in a free front end which is provided with a transverse upward roll detent form 51.

The base 38 is a box form with open top and open end at the back. It is provided with base mounting holes 53 and 54 for itself, and side wall pivot mounting holes 55 for receiving studs 56 on which the tongue assembly 36 is mounted.

The tongue assembly 36 comprises a plastic member 57 heat staked to the stainless steel tongue 58 as a protective overlay therefor, to avoid scratching or noise from scraping as the camera is mounted and dismounted. This structure also permits a somewhat tight, resilient fit of the tongue in the back of the camera. The tongue is provided with front, depending side legs 59 with mounting openings 60 therein for receiving the pivot studs 56.

As in FIG. 11, the studs 56 each have an outer head 61, and a shank with the same diameter at 62 and 64, with a reduced diameter therebetween, at 63. The base and tongue pivot openings 55 and 60 are of sufficient size to receive the stud shank diameter 62 and 64 in slip-fit assembly. The bias action of the spring 49 against the tongue 36 holds the tongue in the reduced diameter 63 of the studs.

The stainless steel member 58 of the tongue 36 is provided with a transverse front end depending roll form 52 for co-action with the detent 51 on the spring 49. Further, the tongue plate 58 is provided with a lengthwise axial depression 70. This provides strength against bending about any transverse axis, so the tongue is lightweight yet rigid in its movement about the pivot axis defined by the studs 56. The torsional movement indicated in FIG. 8, for example, is made possibly by the relatively thin resilient nature of the stainless steel plate 58, and this torsion is essentially about the lengthwise central axis of this plate, along the length of the depression 70.

The support plate 65 within the case 11 is secured to the base 38 through the case wall by rivets and bolts as at 68 and 69. The front top edge of the case 11 is rolled downward and inward as at 67 to form a depression for the console parts, see FIG. 2, and the front edge of the support plate 65, FIG. 12, as similarly rolled, as an added structural support feature for the assembly 18.

The various parts of the support structure 18 lend themselves to simple assembly. First, the support base 38 and the support plate 65 are joined by pop rivets 68. Then, with the spring 49 loosely therebetween, the tongue 36 is mounted on the base 38 by slipping the studs 56 into the pivot holes 55 and 60. Finally, the back end of the spring 49 is secured together with the base 38 and the support plate 65 under strong assembly force by bolts 69. This last action brings the spring bias into play against the under side of the tongue 36 with the assembly result indicated in FIG. 11.

The FIG. 12 assembly shows, in full lines, the support structure 18 in portage condition, with the tongue 36 pivoted fully to the left, the rear, into its out of the way storage position. The dotted line showing 71 of the tongue indicates the camera mounting position of the tongue, FIG. 5, with the tongue held in this position by the spring holding of the tongue portion 52 against the spring form 51. The broken line 39 indicates the position of the tongue 36 with the camera mounted thereon and at rest as in FIG. 7. The dotted line showing 72 of the tongue indicates the forward movement limit of the pivot action of the tongue, which may be either when the spring abuts the base or when the tongue engages the front wall of the support base 38, depending on particular structure and assembly.

Accordingly, in the operation of the device, of this invention, the carrying case as in FIG. 2, with the camera inside, is carried to a particular location for operation. There the camera is removed from the case and mounted on top thereof, with the case on a suitable support such as a table. The operator may then proceed as indicated in FIG. 1, to aim and operate the camera, to operate the console, and to provide identification photograph cards.

A camera suitable for such use is shown in brief in FIG. 13 and 14, as related to the list of copending patent applications set forth hereinbefore.

The particular camera illustrated involves a system which, in a single sheet of photographic material, exposes first one area of such material and thereafter another such area. A film holder is provided which is movable to present such photographic material sheet areas in sequence to an optical system. In this system each such exposure comprises a subject image and the image of a data card on mutually exclusive portions of each of such areas of photographic material.

In FIG. 14, the camera comprises a front section 110 containing the optical system and a rear section 111 containing a film pack 112. In the rear section 111 a sheet of the film, as a sheet of photographic material 113 presented at a focal plane 114.

In the front section 110, a data card holder 115 is placed for illumination by an electronic flash unit 116, and is provided with an optical system comprising a mirror 117, a lens unit 118, a polarizing member 119, and another mirror 120. This optical system images the data card at the focal plane 114. Further, an objective lens unit 121 is provided, for imaging a subject at the focal plane 114, through a suitable polarizing member (not shown) when the mirror 120 is pivoted up out of the way, with a following baffle 122 to prevent undesirable reflection therefrom. A second electronic flash unit 123 is suitably placed for illuminating the subject, and is suitably operatively associated and synchronized with shutter operation of the objective unit 121.

A camera operating pushbutton on structure 124 is operable to sequentially achieve in either the up or down position of the camera back, first a picture of the data card at 115 by actuating the flash 116 and second, a picture of the subject by first moving the mirror 120 to its up position by means of a cam 125 through a cable connection 126 and then actuating the flash 123 and through a cable, a shutter in the lens unit 121. The flash units 116 and 123 are actuated, respectively, through electrical switches 127 and 128. Prior to exposure of the data card, a polarizing plate 129 is moved into overlying contact with the film 113 at the focal plane 114. The polarizing plate 129 contains two sets of polarizing material, with each set suitably related to the polarizing members in the data card and subject optical systems, as exemplified by 119. A validation signature may also be incorporated in each of the sets of polarizing material in the polarizing plate 129.

In either the up or down position of the camera back, the camera is actuated by pushing down the button 124. The action is as follows: Switch 131 is actuated to temporarily disable a charge circuit for the flash units 116 and 123. Polarizer plate 129 is released by cam 125 and moved by spring 139 into overlying position against the film 113, switch 127 is actuated and flash unit 116 is discharged. A picture of a data card in 115 is thus taken, by way of mirror 117, lens unit 118, polarizer 119, and mirror 120. As the pushbutton continues down thereafter, cam 125 is further rotated, mirror 120 is pivoted up out of the way, and switch 128 is actuated, to fire the flash unit 123. A picture of a subject is thus taken, through the lens and shutter unit 121 and a polarizer (not shown) orthogonally disposed with respect to polarizer 119. As the button 124 is released, the system reverts to the situation of FIG. 14.

In the course of operating the camera system of this invention on a controlled basis, there are three movement functions accomplished by the operator. First, the pushbutton 24 is pushed down, and returns to its initial position, FIG. 1, under the action of a suitable return spring, which may be associated with the cam 25. Second, the camera back 11, starting from its up position as shown in FIG. 1, is moved, by hand, down to the FIG. 1 dotted line position after the first picture is taken (data card and subject). After the second picture is taken (again data card and subject) in this down position, the camera back is again moved (by hand) in a return to its original, starting position as in FIG. 1. Third, when both pictures have been taken and the camera back is again in its FIG. 1 position, the operator pulls the pull-tab 30 to initiate development of the exposed film.

In the camera structure, a bail 138 is used to move the polarizing plate 129 toward and away from the film pack 112. When the pictures are taken, the plate 129 is flat against the film, and when the film tab is to be pulled, the plate 129 is moved away from the film. The spring 139 is biased against the camera support structure to constantly urge the plate 129 toward the film pack 112. At the proper time, the cam 125 engages the bail 138 to move it about its mounting pivot and thus pull the plate 129 away from the film. When the back is in the down position, the cam 125 does not contact the bail 138 because there is no need at that stage of the operational cycle, to move the plate 129 away from the film pack.

This camera system has means for sliding the back up and down, with the film holder in it. Thus two identification cards may be produced from each photographic sheet. Thus each plate 129 includes two sections 100, as in FIG. 13; each adapted to overlie approximately one-half of the photographic sheet 113. When the back is in its FIG. 14 solid line position, the lower half of sheet 113 may be employed to produce a first identification card. Subsequently, the camera back, and film, may be slideably displaced downwardly to bring the upper half of the sheet 124, overlaid by a second section 100 of the plate 129, into position for photographic operations.

In FIG. 13, a section 100 of the polarizing plate 129 has been exploded to more clearly illustrate its various components.

As shown in FIG. 13, a sheet 101, of polarizing materials is sandwiched between a pair of transparent support plates 102 and 103. As indicated, the polarizing plate 129 overlies and is positioned in close proximity to the sheet of photographic material 113 when the subject and data card are being photographed. Consequently, the illustrated section of the sheet of polarizing material 101 may have approximately the same dimensions as the finished identification card. In the illustrated embodiment, this sheet 101 comprises a first generally "L-shaped" section 104 having its transmission axis aligned with that of the light polarizer 119 and a rectangularly shaped section 105 having its transmission axis aligned with that of the light polarizer for the objective 121. The former section 104 has the same size and shape of a section 106 of the photographic sheet 113 which it is adapted to overlie and on which the data card image is intended to be recorded, while the latter section 105 has the same size and shape of a section 107 of the photographic sheet 113 which it is adapted to overlie and on which the subject's image is intended to be recorded. Conventional means may be employed to fabricate the sheet of polarizing materials 101. For instance, this sheet 101 may comprise a lamination of polyvinyl alcohol sheets, each having been stretched and molecularly oriented so as to be birefringent, appropriately dyed and printed in accordance with current techniques to provide the aforementioned sections 104 and 105 having orthogonally aligned transmission axes. Alternately, other conventional forms of polarizing sheet material may be cut, aligned, and mounted on a suitable transparent support.

The support plates 102 and 103 may be formed with any suitable material, such as an acrylic lucite or a glass, and appropriately adhered to the opposed faces of the sheet 101. These support plates 102 and 103 not only serve to support the sheet of polarizing materials, 101, but also serve to protect that sheet from foreign matter, abrasion, etc. Importantly, the support plate 103 is provided with indicia 108, such as a validating signature, company name, trademark, or other symbol, which is intended to photographically reproduce on the sheet of photographic material 113. In this respect, such indicia may be hot stamped in an opaque ink into a surface of the support 103. Preferably, it would be stamped into the surface of that support plate 103 intended to be mounted adjacent the sheet of photographic material 113 and at a position thereon so as to be photographicaly reproduced in part on the section 107 thereof and in part on the section 106 thereof. When the plate 129 is disposed against the sheet 124, the sections 104 and 105 of its sheet of polarizing materials 101 respectively overlie the sections 106 and 107 of the photographic sheet 113. To minimize any distortion of the images, it is desirable that the support plate 103 be relatively thin.

It will thus be appreciated that the polarizing plate 129, in combination with the light polarizers like 119 serves to effectively limit the light rays intersecting section 107 of the sheet of photographic material 113 to those from the subject and to limit the light rays intersecting section 106 of the sheet of photographic material to those from the data card 115. Further, it is naturally desirable that light rays from the data card 115, which are polarized by the element 119, be directed effectively and efficiently onto the appropriate section 106 of the photographic sheet 113. As indicated, at the same time, it is desirable that section 105 of the sheet 101 preclude any such rays from impinging upon section 107 of the photographic sheet 113. Consequently, the polarization characteristics of such light rays should not be distorted or changed to any extent intermediate the element 119 and the sheet 113. In this respect, the alignment of the mirror 120 and the polarizing element 119 is preferably such that the transmission axis of that element is parallel to the plane of the mirror. Any deviation from this type of alignment could result in a component of the light rays being oriented parallel to the transmission axis of the section 105 of the sheet 101, whereby such component would pass through that section of the sheet 101 onto section 107 of the photographic sheet 113.

In order to reduce the pull force which must be exerted by the operator on the tab 130 to effect the removal of each film unit from the film holder 111, and further, to preclude scratching the exposed surface of the photographic sheet 113 at such time, it is desirable that the polarizing plate 129 be positioned out of contact with an exposed photographic sheet whenever such a sheet is being withdrawn from the film holder. Consequently, the validation plate 129 is mounted within the camera system for selective displacement between its position as shown in FIG. 14 of the drawings and its position against the film 113.

In the up position of the film holder as in solid lines in FIG. 14, when the pushbutton 124 is actuated, cam 125 rotates and releases the bail 138 to allow spring 139 to move the polarizing plate 129 to and against the film 113. As the button 124 is released, after the flash units 116 and 123 have been fired, cam 125 reverses, and again engages the bail 138 to move the plate 129 away from the film 113. Thus at this point the pull-tab 130 may be pulled, if desired, without damage to the film from scraping engagement with the plate 129, and with low pull force. Thereafter, when the film holder 111 is moved down to its second position, as at 111 in dotted lines in FIG. 14, the bail 138 moves down and out of contact with the cam 125. Thus pushing the button 124 and rotating the cam 125 in taking pictures of data and subject in the down position of the film, has no effect in terms of movement of the polarizing plate with respect to the film 113. The plate 129 stays in contact with the film until the film holder is again moved up and the bail 138 again engages the cam 125. This system is thus not designed to accomodate pulling the tab in the down position. As a protective control in this situation, the apron 137 is in tab covering position 137 so the operator cannot pull the tab 130.

FIG. 14 illustrates the schematic location of an aiming light 73 for the camera, with broken line 15 indicating the beam therefrom, as in FIG. 1.

FIG. 14, further, illustrates the location in the camera, of the support tongue 36, without detail of its shoulder support therein as set forth in FIG. 6.

This invention, therefore, provides a new and useful identification card photography system in which such system is portable, with special support structure therein for a camera in temporary use, such support structure including storage capability, and camera aiming capability in two directions.

As many embodiments may be made of the above invention, and as changes may be made in the embodiment set forth above without departing from the scope of the invention, it is to be understood that all matter hereinbefore set forth and in the accompanying drawings is to be interpreted as illustrative only and not in a limiting sense.

I claim:

1. Portable apparatus for use with a camera including means for slidably receiving a tongue, said apparatus comprising:

a housing;

a compartment within said housing for storing such camera when it is not in use;

means for selectively providing access to said compartment to facilitate the positioning of such camera therein and the subsequent removal of such camera therefrom;

hand engagable means on said housing for facilitating the portage of said apparatus; and means provided on said housing for mounting such camera thereon for adjustment in at least two orthogonally aligned directions with respect to said housing to facilitate its proper orientation during photographic operations, said mounting means including a tongue of complementary configuration with respect to such tongue receiving means of such camera, means for connecting said tongue to said housing for pivotal displacement about a given axis between a first position, wherein it is folded upon said housing, through a second position, wherein it is accessible to have such camera slidably mounted thereon, to a third position and spring means for yieldably restraining said tongue in its said first and second positions whenever it is disposed in either of those said positions, said spring means tending to return said tongue to its said first position as it is displaced away therefrom until it has reached a given point intermediate its said first and second positions and thereafter tending to position said tongue in its said second position whenever it is disposed between said given point and its said third position.

2. The apparatus of claim 1 wherein said mounting means is structured so that said spring means serves to seat such camera against said apparatus when such camera is slidably mounted on said tongue and such camera may thereafter be pivotally displaced on said tongue towards said third position of said tongue to facilitate the proper orientation of such camera for purposes of photographing a subject located in front of such camera.

3. The invention of claim 2 wherein such camera is of the self-developing type in which an exposed film unit is treated with a processing fluid responsive to its being withdrawn from such camera and said tongue is positioned on said apparatus housing to facilitate the manual withdrawal of such an exposed film unit from such camera when such camera is seated against said apparatus housing under the influence of said spring means.

4. The invention of claim 2 wherein such camera is of the back-loading type and said tongue is positioned on said apparatus housing to facilitate the loading of such camera with film when such camera is seated against said apparatus housing under the influence of said spring means.

5. Portable apparatus for use with a camera including means for slidably receiving a tongue, said apparatus comprising:

a housing;

a compartment within said housing for storing such camera when it is not in use;

means for selectively providing access to said compartment to facilitate the positioning of such camera therein and the subsequent removal of such camera therefrom;

hand engagable means on said housing for facilitating the portage of said apparatus; and means provided on said housing for mounting such camera thereon for adjustment in at least two orthogonally aligned directions with respect to said housing to facilitate its proper orientation during photographic operations, said mounting means including a tongue of complementary configuration with respect to such tongue receiving means of such camera, means for connecting said tongue to said housing for pivotal displacement about a given axis between a first position wherein it is folded upon said housing and at least a second position wherein it is accessible to have such camera slidably mounted thereon and means for yieldably restraining said tongue in at least its said first position whenever it is disposed therein, said tongue being structured for torsional movement about an axis orthogonally disposed with respect to said given axis.

6. Portable apparatus for use with a camera including means for slidably receiving a tongue, said apparatus comprising:

a housing;

a compartment within said housing for storing such camera when it is not in use;

means for selectively providing access to said compartment to facilitate the positioning of such camera therein and the subsequent removal of such camera therefrom;

hand engagable means on said housing for facilitating the portage of said apparatus; and means provided on said housing for mounting such camera thereon for adjustment in at least two orthogonally aligned directions with respect to said housing to facilitate its proper orientation during photographic operations, said mounting means including a base member connected to said apparatus housing, a tongue of complementary configuration with respect to such tongue receiving means of such camera and having an end thereof configured in detending roll form, means for pivotally connecting said tongue to said base member and a leaf spring having one end thereof connected to said base member and a detent formed adjacent its other end to engage said end of said tongue, said detent being configured to yieldably restrain said tongue in its said first position under the force of said leaf spring when said tongue is disposed therein and to yieldably restrain said tongue in its said second position under the force of said leaf spring when said tongue is disposed therein, said end of said tongue and said detent on said leaf spring serving as an over-center mechanism to automatically return said tongue to either its said first or its said second position whenever it is manually displaced to a position intermediate its said first and second positions and subsequently released.

7. The invention of claim 6 wherein said end of said tongue and said detent on said leaf spring serve to yieldably urge said tongue into its said second position whenever said tongue is pivotally displaced from its said second position in a direction away from its said first position.

* * * * *